United States Patent [19]
Nakano

[11] Patent Number: 5,187,995
[45] Date of Patent: Feb. 23, 1993

[54] SHIFT CONTROL SYSTEM FOR CONTINUOUSLY VARIABLE TRACTION ROLLER TRANSMISSION

[75] Inventor: Masaki Nakano, Kanagawa, Japan

[73] Assignee: Nissan Motor Co., Ltd., Yokohama, Japan

[21] Appl. No.: 850,281

[22] Filed: Mar. 12, 1992

[30] Foreign Application Priority Data

Mar. 26, 1991 [JP] Japan .................... 3-087821

[51] Int. Cl.⁵ .............................................. F16H 15/08
[52] U.S. Cl. ................................................. 476/10
[58] Field of Search ................... 74/200, 201, 190.5

[56] References Cited

U.S. PATENT DOCUMENTS

| | | | |
|---|---|---|---|
| 4,905,529 | 3/1990 | Nakano | 74/201 |
| 4,960,004 | 10/1990 | Hibi et al. | 74/200 |
| 5,052,236 | 10/1991 | Nakano | 74/200 |
| 5,083,473 | 1/1992 | Nakano | 74/200 X |
| 5,099,710 | 3/1992 | Nakano | 74/200 |

FOREIGN PATENT DOCUMENTS

| | | | |
|---|---|---|---|
| 61-119865 | 6/1986 | Japan | 74/200 |
| 61-119866 | 6/1986 | Japan | 74/200 |
| 61-127964 | 6/1986 | Japan | 74/200 |
| 62-2061 | 1/1987 | Japan | 74/200 |
| 62-258254 | 11/1987 | Japan | 74/200 |
| 2-85560 | 3/1990 | Japan | 74/200 |
| 4-29659 | 1/1992 | Japan | . |

Primary Examiner—Dirk Wright
Attorney, Agent, or Firm—Foley & Lardner

[57] ABSTRACT

In a shift control system for a continuously variable traction roller transmission, a shift control valve includes a stepper motor which is driven in response to a commanded speed ration. The stepper motor drives a pinion which engages a rack. The rack is connected to a spool disposed in a sleeve. The relative position between the spool and sleeve determines the hydraulic pressure applied to change the speed ratio of the transmission. The sleeve is moved by shift members while the spool is moved by the stepper motor. The force necessary to move the spool is less than in other designs, thereby allowing for the use of a smaller stepper motor.

2 Claims, 2 Drawing Sheets

SHIFT CONTROL SYSTEM FOR CONTINUOUSLY VARIABLE TRACTION ROLLER TRANSMISSION

BACKGROUND OF THE INVENTION

The present invention relates to a shift control system for a continuously variable traction roller transmission.

A shift control system for a continuously variable traction roller transmission is disclosed, for example, in JP 2-131945. This shift control system comprises a shift valve including a stepper motor having a rotational position determined in accordance with a commanded speed ratio, a sleeve axially movable by the stepper motor, and a spool slidably fitted in the sleeve. The spool is axially driven to correspond to an actual speed ratio via a cam, a link, etc. When the actual speed ratio corresponds to the speed ratio commanded to the stepper motor, the relative positional relationship between the sleeve and the spool falls in a normal state, supplying hydraulic pressure to a hydraulic cylinder apparatus so as to maintain the speed ratio at that moment. On the other hand, when the relative positional relationship between the sleeve and the spool is out of the normal state, hydraulic pressure is supplied to the hydraulic cylinder apparatus so that the actual speed ratio corresponds to the commanded speed ratio.

With the aforementioned shift control system for a continuously variable traction roller transmission, however, there is a disadvantage. The disadvantage is due to generation of friction resistance on both outer and inner peripheries of the sleeve when moving, thereby requiring a great operating force to displace the sleeve. Particularly, since the viscosity of hydraulic fluid increases when the temperature is extremely low, this disadvantage becomes striking at low temperature. Thus, the stepper motor for moving the sleeve must have great torque, resulting in an increased size of the stepper motor.

It is, therefore, an object of the present invention to provide a shift control system for a continuously variable traction roller transmission which can be operated by a stepper motor having small torque.

SUMMARY OF THE INVENTION

According to one aspect of the present invention, there is provided a shift control system for a continuously variable traction roller transmission, the continuously variable traction roller transmission including input and output disks, a pair of roller support members for the pair of traction rollers, each having rotation shanks and being rotatable therewith and movable in an axial direction thereof, and a hydraulic cylinder apparatus arranged to move each of the pair of roller support members in the axial direction of the rotation shanks, the shift control system comprising:

a cam mounted to one of the pair of roller support members for unitary rotation thereof;

a link arranged to be swingable with a rotation of said cam, said link having one end being in contact with said cam; and control valve means for adjusting a hydraulic pressure to be supplied to the hydraulic cylinder apparatus, said control valve means including a sleeve, a spool fitted therein, a stepper motor having a rotational position determined in response to a speed ratio as commanded, and a drive member driven by said stepper motor in an axial direction of said shift control valve means, said sleeve being connected to the other end of said link so as to be movable in accordance with a rotational displacement of the rotation shanks in said axial direction of said shift control means, said spool being connected to said drive member so as to be movable therewith in said axial direction of said shift control valve means, wherein when said rotational displacement of the rotation shanks corresponds to said speed ratio, a relative positional relationship between said sleeve and said spool falls in a normal state wherein said hydraulic pressure is adjusted to provide a force to the rotation shanks in the axial direction of the rotation shanks so as to maintain said rotational displacement of the rotation shanks, wherein when said relative positional relationship is out of said normal state, said hydraulic pressure is adjusted to change said force so that said rotational displacement of the rotation shanks corresponds to said speed ratio.

According to another aspect of the present invention, there is provided, in a continuously variable traction roller transmission:

input and output disks;

a pair of traction rollers arranged between a toroidal concavity defined by said input and output discs for frictional engagement therewith;

a pair of roller support members for said pair of traction rollers, each having rotation shanks and being rotatable therewith and movable in an axial direction thereof;

a hydraulic cylinder apparatus arranged to move each of said pair of roller support members in said axial direction of said rotation shanks;

a cam mounted to one of said pair of roller support members for unitary rotation thereof;

a link arranged to be swingable with a rotation of said cam, said link having one end being in contact with said cam; and control valve means for adjusting a hydraulic pressure to be supplied to said hydraulic cylinder apparatus, said control valve means including a sleeve, a spool fitted therein, a stepper motor having a rotational position determined in response to a speed ratio as commanded, and a drive member driven by said stepper motor in an axial direction of said shift control valve means, said sleeve being connected to the other end of said link so as to be movable in accordance with a rotational displacement of said rotation shanks in said axial direction of said shift control means, said spool being connected to said drive member so as to be movable therewith in said axial direction of said shift control valve means, wherein when said rotational displacement of said rotation shanks corresponds to said speed ratio, a relative positional relationship between said sleeve and said spool falls in a normal state wherein said hydraulic pressure is adjusted to provide a force to said rotation shanks in said axial direction of said rotation shanks so as to maintain said rotational displacement of said rotation shanks, wherein when said relative positional relationship is out of said normal state, said hydraulic pressure is adjusted to change said force so that said rotational displacement of said rotation shanks corresponds to said speed ratio.

DETAILED DESCRIPTION OF THE INVENTION

Figure 1:
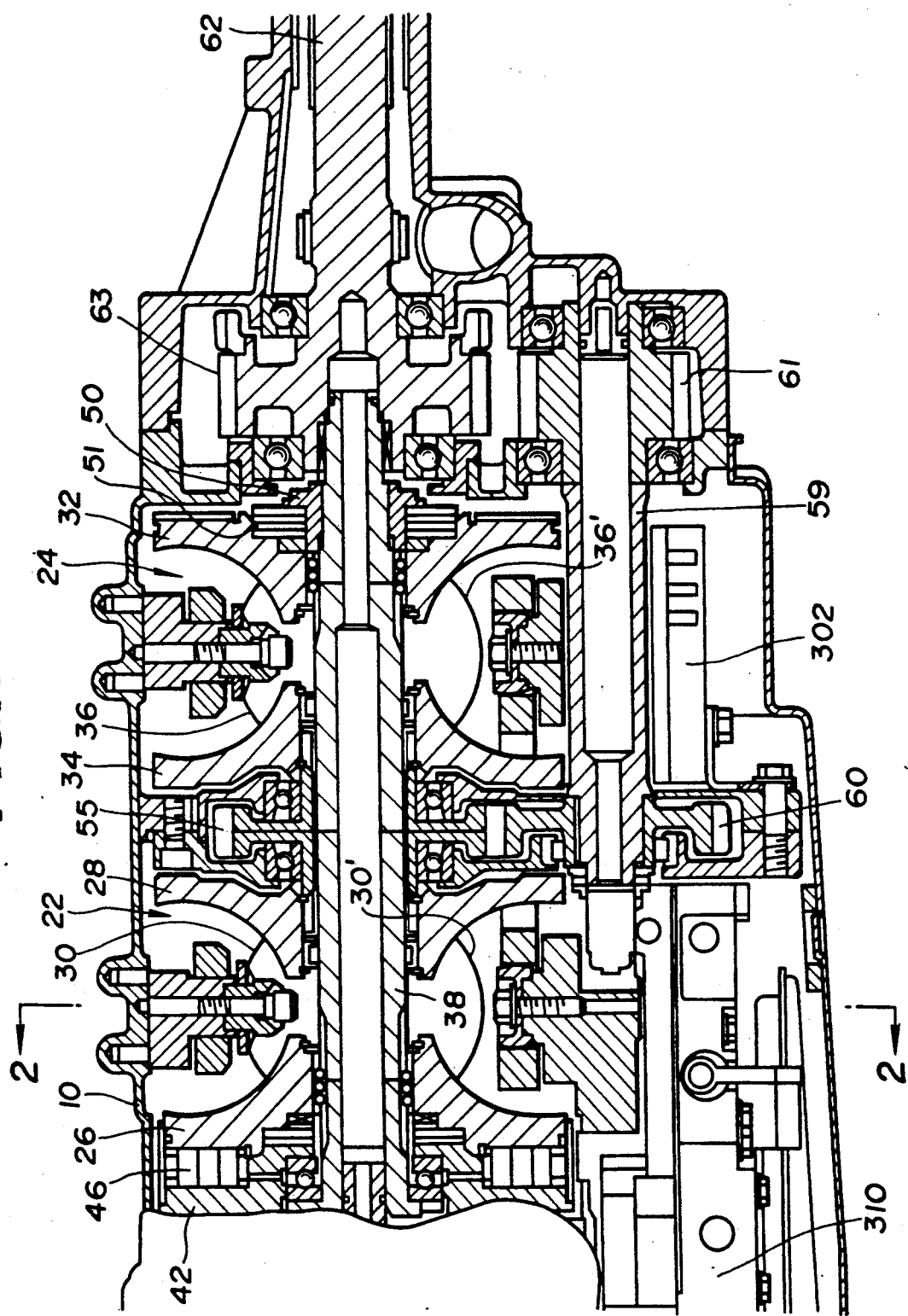
FIG. 1 is a longitudinal section showing a preferred embodiment of the present invention.
Figure 2:
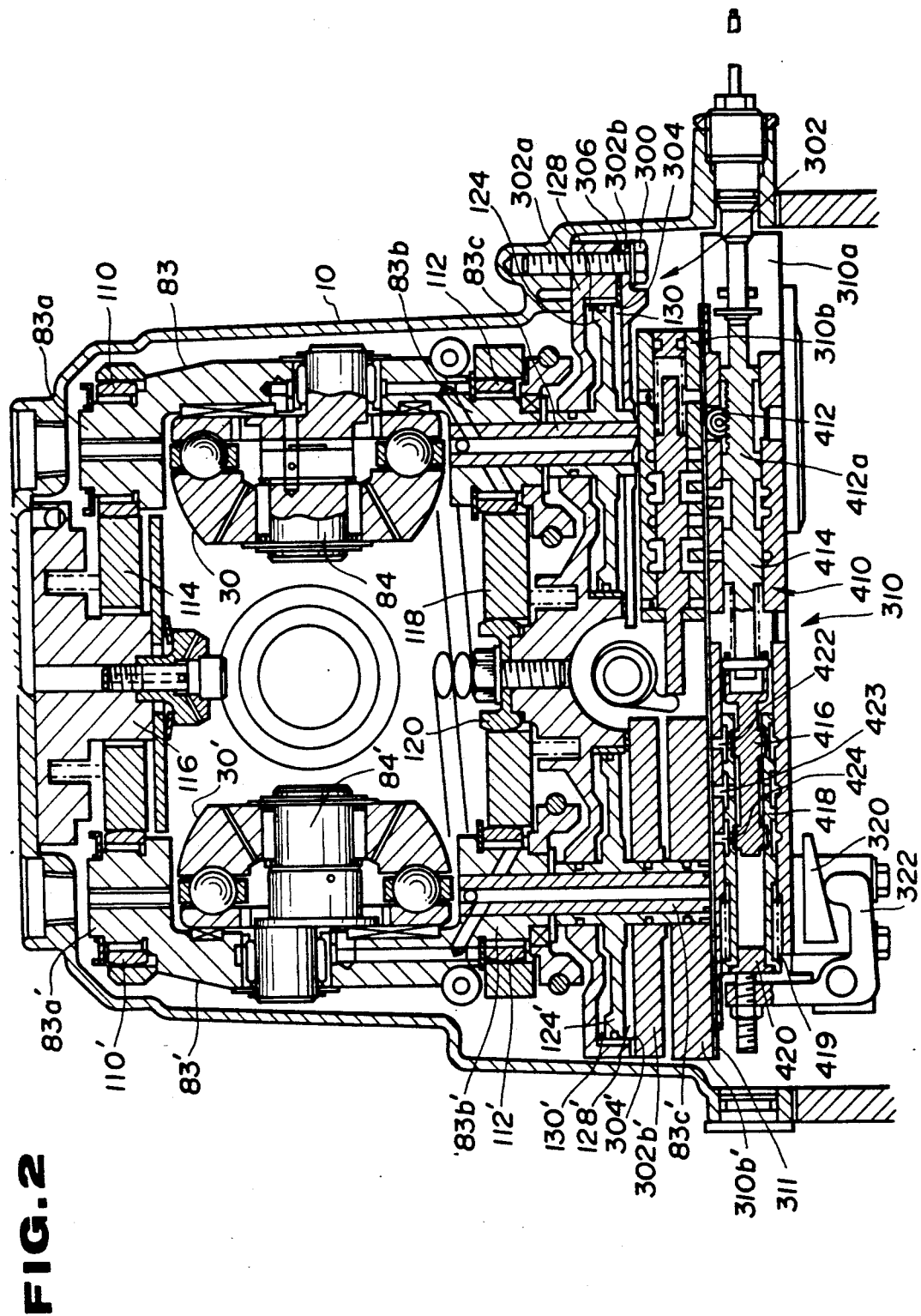
FIG. 2 is a cross section taken along the line 2—2 in FIG. 1.

FIGS. 1 and 2 show a preferred embodiment of the present invention. Referring particularly to FIG. 1, first and second continuously variable transmission units 22, 24 are arranged in a casing 10. The first continuously variable transmission unit 22 comprises an input disk 26, an output disk 28, and a pair of traction rollers 30, 30' for transmitting torque between the two. The input and output disks 26, 28 have toroidal faces, respectively, which serve as contact faces with the pair of traction rollers 30, 30'. The ratio of rotational speed of the input disk 26 to the output disk 28 can be continuously altered by changing the contact condition of the pair of traction rollers 30, 30' relative to the input and output disks 26, 28. In a manner similar to the first continuously variable transmission unit 22, the second continuously variable transmission unit 24 comprises an input disk 32, an output disk 34, and a pair of traction rollers 36, 36'. It is to be noted that the arrangement of the input and output disks 32, 34 is opposite to that of the input and output disks 26, 28 of the first continuously variable transmission unit 22. That is, the output disks 28, 34 are arranged to be adjacent to each other. The input disk 26 is supported on an input shaft 38 at the outer periphery thereof via a ball spline. The input shaft 38 is connected to a forward and reverse switching mechanism and a torque converter (not shown) so as to receive engine torque via the two. A cam flange 42 is disposed on the back side of the input disk 26. A cam roller 46 is disposed on cam faces of the cam flange 42 and the input disk 26 which face each other. The cam roller 46 is so shaped as to generate force to press the input disk 26 toward the output disk 28 upon relative rotation of the input disk 26 and the cam flange 42. Likewise, the input disk 32 of the second continuously variable transmission unit 24 is connected to the input shaft 38 via a ball spline. The input disk 32 undergoes force in the direction of the output disk 34 from a dish plate 51 which receives compression from a loading nut 50 engaged with the input shaft 38. The output disks 28, 34 of the first and second continuously variable transmission units 22, 24 are rotatably supported on the input shaft 38 via needle bearings, respectively. A drive gear 55 is arranged for unitary rotation with the output disks 28, 34. The drive gear 55 is engaged with a follower gear 60 connected, via a spline for unitary rotation, to a countershaft 59 at one end thereof which is disposed in parallel with the input shaft 38. Integrally formed with the countershaft 59 at the other end thereof is a gear 61 which is engaged via an idler gear (not shown) with a gear 63 integrated with an output shaft 62.

FIG. 2 shows a fragmentary section of the first continuously variable transmission unit 22. It is to be noted that the structure of the second continuously variable transmission unit 24 is generally identical to that of the first continuously variable transmission unit 22 as shown in FIG. 2. Referring to FIG. 2, particularly to a right half thereof, a roller support member 83 is rotatably and vertically movably supported on upper and lower rotation shanks 83a, 83b via spherical bearings 110, 112. The traction roller 30 is rotatably supported on the roller support member 83 via an eccentric shaft 84. The spherical bearing 110 is supported by a link 114 which is in turn supported by a link post 116 fixed to the casing 10. Likewise, the spherical bearing 112 is supported by a link 118 which is in turn supported by a link post 120. The roller support member 83 comprises an extension shank 83c disposed to be concentric with the rotation shank 83b. The extension shank 83c is so constructed as to be rotatable with the rotation shank 83b. A piston 124 is arranged at the outer periphery of the extension shank 83c. The piston 124 is fitted in a piston insertion hole 304 which is formed in a main cylinder body 302a mounted to the casing 10 by a bolt 300. An auxiliary cylinder body 302b is mounted to the main cylinder body 302a on the lower side thereof by the bolt 300 via a separate plate 306. The main and auxiliary cylinder body 302a, 302b constitute the cylinder body 302. Thus, hydraulic chambers 128, 130 are formed above and below the piston 124. It is to be noted that hydraulic chambers 128', 130' on the left in FIG. 2 are vertically opposed to the hydraulic chambers 128, 130. The piston 124 is vertically movable by hydraulic pressure operating therein. The piston 124 and the piston insertion hole 304 of the main cylinder body 302a constitute a hydraulic cylinder apparatus.

A valve body 310 is disposed below the cylinder body 302. The valve body 310 comprises a main valve body 310a and an auxiliary valve body 310b mounted to the main valve body 310a on the upper side thereof via a separate plate 311. A shift control valve 410 is disposed on the main valve body 310a. The shift control valve 410 comprises a stepper motor 412 driven in response to a speed ratio as commanded, a spool (drive member) 414 with rack having teeth engaged with a pinion 412a which is driven by the stepper motor 412 and being axially movable by rotation thereof, a spool 416 having one end connected to the spool 414 and being axially movable therewith by rotation of the stepper motor 412, a sleeve 418 arranged on the outer periphery of the spool 416, a spring 419 for biasing the sleeve 418 to the left as viewed in FIG. 2, and a retainer 420 fitted in the sleeve 418 at the outer end thereof. The main valve body 310a has hydraulic passages 422, 424. The hydraulic passage 422 is connected to the hydraulic chambers 128, 128', whereas the hydraulic passage 424 is connected to the hydraulic chambers 130, 130'. Line pressure within a hydraulic passage 423 serves as a hydraulic source, which is distributed to the hydraulic passages 422, 424 in accordance with the relative positional relationship between the spool 416 and the sleeve 418. Specifically, the relationship between a land of the spool 416 and an oil groove of the sleeve 418 is so established that hydraulic pressure within the hydraulic passages 422 is equal to hydraulic pressure within the hydraulic passages 424 in a normal state as shown in FIG. 2, and that hydraulic pressure within the hydraulic passage 424 is higher than that within the hydraulic passage 422 when the spool 416 is moved relatively to the left as viewed in FIG. 2, whereas hydraulic pressure within the hydraulic passage 424 is lower than that within the hydraulic passage 422 when the spool 416 is moved relatively to the right as viewed in FIG. 2. Mounted to the extension shank 83c' at the lower end thereof is a cam 320 which is rotatable with the extension shank 83c', and has a bevel with which a link 322 is in contact. Thus, with rotation of the cam 320, the link 322 is swung so that a point thereof can press the retainer 420.

Next, the operation of this embodiment will be described. With an increase in rotation of the input shaft 38, the input disk 26 is rotated to follow the cam flange 42 due to operation of the cam roller 46, and generates at the same time thrust corresponding to input torque of the input shaft 38. Thus, the traction rollers 30, 30' are rotated without slippage in holding between the input and output disks 26, 28, transmitting power from the input disk 26 to the output disk 28. When altering the speed ratio on the large side, for example, the spool 414 with rack is moved to the left as viewed in FIG. 2 by the stepper motor 412 so as to move the spool 416 to the left as viewed in FIG. 2. Since the sleeve 418 is not moved immediately, the relative relationship between the spool 416 and the sleeve 418 is changed to increase hydraulic pressure within the hydraulic passage 424 and decrease pressure within the hydraulic passage 422. Since hydraulic pressure within the hydraulic passage 422 is supplied to the hydraulic chamber 128, and pressure within the hydraulic passage 424 is supplied to the hydraulic chamber 130, the piston 124 undergoes force for upward motion. On the other hand, since the hydraulic chambers 128', 130' are arranged to be vertically opposed to the hydraulic chambers 128, 130, the piston 124' undergoes force for downward motion. Thus, the roller support member 83 is urged to move upwardly, whereas the roller support member 83' is urged to move downwardly. Since this causes a change in the direction of force which operates on the traction rollers 30, 30' in the tangent direction thereof, the roller support members 83, 83' are rotated inversely with the rotation shanks 83a, 83b and 83a', 83b', respectively. Thus, the radius of each of the traction rollers 30, 30' at a contact point thereof with the input disk 26 is decreased, whereas the radius of each of the traction rollers 30, 30' at a contact point thereof with the output disk 28 is increased. That is, the speed ratio is altered on the large side. Rotation of the roller support member 83' is transmitted to the cam 320 via the extension shank 83c'. With rotation of the cam 320, the link 322 is swung so that the point thereof is moved to the left as viewed in FIG. 2. Thus, the sleeve 418 is urged to move to the left as viewed in FIG. 2 by the spring 419. As the sleeve 418 is moved to the left as viewed in FIG. 2, a level of hydraulic pressure within the hydraulic passage 422 and a level of hydraulic pressure within the hydraulic passage 424 come close to each other. Finally, the sleeve 418 is stabilized in the normal state in which the two levels are the same.

When altering the speed ratio on the small side, the operation is generally identical as described above, however, it is carried out inversely since the stepper motor 412 is rotated in the opposite direction. Accordingly, since the direction of torque transmitted to the cam 320 via the extension shank 83c' also becomes inverse, the point of the link 322 is urged to move to the right as viewed in FIG. 2 so as to press the retainer 420 to the right as viewed in FIG. 2. Thus, the sleeve 418 is moved to the right as viewed in FIG. 2, and stabilized when a level of hydraulic pressure within the hydraulic passage 422 becomes identical to a level of hydraulic pressure within the hydraulic passage 424. Having described the shift operation with regard to the first continuously variable transmission unit 22, it is to be noted that the same shift operation is carried out with regard to the second continuously variable transmission unit 24.

As described above, the spool 416 of the shift control valve 410 is driven by the stepper motor 412 via the spool 414 with rack. As to the spool 416, the outer diameter portion thereof is fitted in the inner diameter portion of the sleeve 418, generating friction resistance only on this outer diameter portion of the spool 416 when moving axially. On the other hand, as to the sleeve 418, not only the inner diameter portion thereof is received in the spool 416, but the outer diameter portion thereof is fitted in a hole of the main valve body 310a, generating friction resistance on both inner and outer diameter portions of the sleeve 418. Accordingly, the force necessary to drive the spool 416 axially is smaller than that necessary to drive the sleeve 418 axially, resulting in a decreased size of the stepper motor 412.

What is claimed is:

1. A shift control system for a continuously variable traction roller transmission, the continuously variable traction roller transmission including input and output disks, a pair of roller support members for a pair of traction rollers, each roller support member having rotation shanks and being rotatable therewith and movable in an axial direction thereof, and a hydraulic cylinder apparatus arranged to move each of the pair of roller support members in the axial direction of the rotation shanks, the shift control system comprising:
   a cam mounted to one of the pair of roller support members for unitary rotation therewith;
   a link arranged to be swingable with a rotation of said cam, said link having a first end in contact with said cam and a second end; and
   control valve means for adjusting a hydraulic pressure to be supplied to the hydraulic cylinder apparatus, said control valve means including a sleeve, a spool fitted therein, a stepper motor having a rotational position determined in response to a speed ratio as commanded, and a drive member driven by said stepper motor in an axial direction of said control valve means,
   said sleeve being connected to the second end of said link so as to be movable in accordance with a rotational displacement of the rotation shanks in said axial direction of said control valve means, said spool being connected to said drive member so as to be movable therewith in said axial direction of said control valve means,
   wherein when said rotational displacement of the rotation shanks corresponds to said speed ratio, a relative positional relationship between said sleeve and said spool falls in a normal state wherein said hydraulic pressure is adjusted to provide a force to the rotation shanks in the axial direction of the rotation shanks so as to maintain said rotational displacement of the rotation shanks,
   wherein when said relative positional relationship is out of said normal state, said hydraulic pressure is adjusted to change said force so that said rotational displacement of the rotation shanks corresponds to said speed ratio.

2. In a continuously variable traction roller transmission:
   input and output disks;
   a pair of traction rollers arranged between a toroidal concavity defined by said input and output discs for frictional engagement therewith;

a pair of roller support members for said pair of traction rollers, each having rotation shanks and being rotatable therewith and movable in an axial direction thereof;

a hydraulic cylinder apparatus arranged to move each of said pair of roller support members in said axial direction of said rotation shanks;

a cam mounted to one of said pair of roller support members for unitary rotation therewith;

a link arranged to be swingable with a rotation of said cam, said link having a first end in contact with said cam and a second end; and control valve means for adjusting a hydraulic pressure to be supplied to said hydraulic cylinder apparatus, said control valve means including a sleeve, a spool fitted therein, a stepper motor having a rotational position determined in response to a speed ratio as commanded, and a drive member driven by said stepper motor in an axial direction of said control valve means, said sleeve being connected to the second end of said link so as to be movable in accordance with a rotational displacement of said rotation shanks in said axial direction of said control valve means, said spool being connected to said drive member so as to be movable therewith in said axial direction of said control valve means, wherein when said rotational displacement of said rotation shanks corresponds to said speed ratio, a relative positional relationship between said sleeve and said spool falls in a normal state wherein said hydraulic pressure is adjusted to provide a force to said rotation shanks in said axial direction of said rotation shanks so as to maintain said rotational displacement of said rotation shanks, wherein when said relative positional relationship is out of said normal state, said hydraulic pressure is adjusted to change said force so that said rotational displacement of said rotation shanks corresponds to said speed ratio.

* * * * *